United States Patent [19]

Haass

[11] 4,370,741

[45] Jan. 25, 1983

[54] PROCESS AND AN APPARATUS FOR TRANSMITTING DATA ACROSS A TWO-WIRE LINE

[75] Inventor: Adolf Haass, Munich, Fed. Rep. of Germany

[73] Assignee: Siemens Aktiengesellschaft, Berlin & Munich, Fed. Rep. of Germany

[21] Appl. No.: 138,707

[22] Filed: Apr. 9, 1980

[30] Foreign Application Priority Data

May 29, 1979 [DE] Fed. Rep. of Germany ....... 2921780

[51] Int. Cl.³ .............................................. H04B 3/20
[52] U.S. Cl. ........................................ 370/24; 370/32; 455/295; 179/170.2
[58] Field of Search ........................... 370/32, 24, 25; 179/170.2; 455/14, 24, 295, 302, 304, 305

[56] References Cited

U.S. PATENT DOCUMENTS 3,922,505 11/1975 Hoge ................................ 179/170.2
4,144,417 3/1979 Oshima ............................ 179/170.2

OTHER PUBLICATIONS

Performance of an Adaptive Echo Canceller Operating In a Noisy, Linear, Time-Invariant Environment, By Rosenberger et al., The Bell System Technical Journal, Mar. 1971, pp. 789-813.

Primary Examiner—Tommy P. Chin
Attorney, Agent, or Firm—Hill, Van Santen, Steadman, Chiara & Simpson

[57] ABSTRACT

A data modulated carrier is branched into two orthogonal components and as a result of correlation with a difference signal supplied to a receiver, first and second regulating signals are produced. The first and second regulating signals each regulate a base band simulation stage to produce respective dummy signals, taking into account the two orthogonal signal components, and form components of a compensation signal which is used to suppress a cross-talk signal which is superimposed on a signal received from a remote station.

21 Claims, 3 Drawing Figures

PROCESS AND AN APPARATUS FOR TRANSMITTING DATA ACROSS A TWO-WIRE LINE

BACKGROUND OF THE INVENTION

1. Field of the Invention

The present invention relates to an apparatus and to a process for transmitting data across a two-wire line from one station to a remote station and vice-versa, wherein the data of the first station produce a cross-talk signal which is superimposed upon the signal transmitted from the remote station and occurs in the received signal, and more particularly to such a system wherein a compensation signal is produced at the first station and a different signal is formed which depends upon the received signal, the cross-talk signal and the compensation signal.

2. Description of the Prior Art

In accordance with known base band transmission processes, data can be transmitted, in duplex operation, across a two-wire line.

SUMMARY OF THE INVENTION

The object of the present invention is to transmit data with a modulated carrier, in duplex operation, across a two-wire line, employing carriers in the same frequency band in both directions.

The object set forth above is achieved, according to the present invention, and in a first embodiment thereof, in that the data are transmitted with a modulated carrier, that the modulated carrier is split into two orthogonal signal components whose phase angles differ by 90°, that the difference signal is correlated with the two orthogonal signal components to produce a first regulating signal and a second regulating signal which indicate the deviation of the first orthogonal signal component from a corresponding first signal component of the cross talk signal, and the deviation of the second orthogonal signal component from a corresponding second signal component of the cross-talk signal, respectively. A first dummy signal and a second dummy signal are produced which are dependent upon the first and second regulating signals, respectively, and upon the data. By multiplicative mixing of the first dummy signal and the first orthogonal signal component, and multiplicative mixing of the second dummy signal and the other orthogonal signal component, multiplicative signals are formed, and the sum signal formed from the two multiplicative signals is used as a compensation signal to suppress the cross-talk signal.

According to another embodiment of the invention, the above object is achieved in that the data are transmitted with a modulated carrier and two signal components are produced which are dependent upon the modulated carrier and are orthogonal to one another. The difference signal is correlated with the two orthogonal signal components to form a magnitude regulating signal which is assigned to the magnitude and a phase regulating signal which is assigned to the phase, and which indicate the deviation of the first orthogonal signal component from the magnitude of the cross-talk signal and the deviation of the other orthogonal signal component from the phase angle of the cross-talk signal, respectively. The magnitude regulating signal and the phase regulating signal, together with the data, form a magnitude adjusting signal and a phase adjusting signal, respectively, which indicate the magnitude of the compensation signal and the phase of the compensation signal, respectively. The modulated carrier and the phase adjusting signal serve to form a phase signal whose phase depends upon both the modulated carrier and upon the phase adjusting signal. The compensation signal is produced by means of the phase signal and the magnitude adjusting signal.

In comparison to four-wire design, both embodiments of the present invention are characterized by a saving of two lines. Compared with other known processes which employ two-wire operation and different carrier frequencies for both directions, both of the embodiments of the present invention are characterized by a small bandwidth requirement or a higher transmission rate.

If the transmission capacity of the two-wire line is to be exploited particularly efficiently, in addition to the data, a speech signal or a further base band data signal can be transmitted across the two-wire line, in which case two non-overlapping bands are provided for the speech signal and for the further base band data signal, on the one hand, and the modulated carrier, on the other hand.

In order that only one single phase shift device should be necessary, it is advantageous for the first orthogonal signal component to be equal to the modulated carrier, and for the other orthogonal signal component to differ from the modulated carrier by a phase angle of 90°.

In order to take into account both orthogonal signal components in the production of the multiplicative signals, it is advantageous to provide two multipliers which, on the one hand, are each supplied with one of the two orthogonal signal components and which, on the other hand, are supplied with the first and second dummy signals, respectively, and which emit the multiplicative signals by way of their outputs.

In order to be able to simulate any phase of the cross-talk signal, it is advantageous to provide a phase regulating stage which modifies the phase of the modulated carrier in dependence upon the phase adjusting signal and which emits the phase signal.

In order to be able to simulate any magnitude of the cross-talk signal, it is advantageous to provide an additional multiplier which is supplied with the phase signal and the magnitude adjusting signal and which emits the compensation signal.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
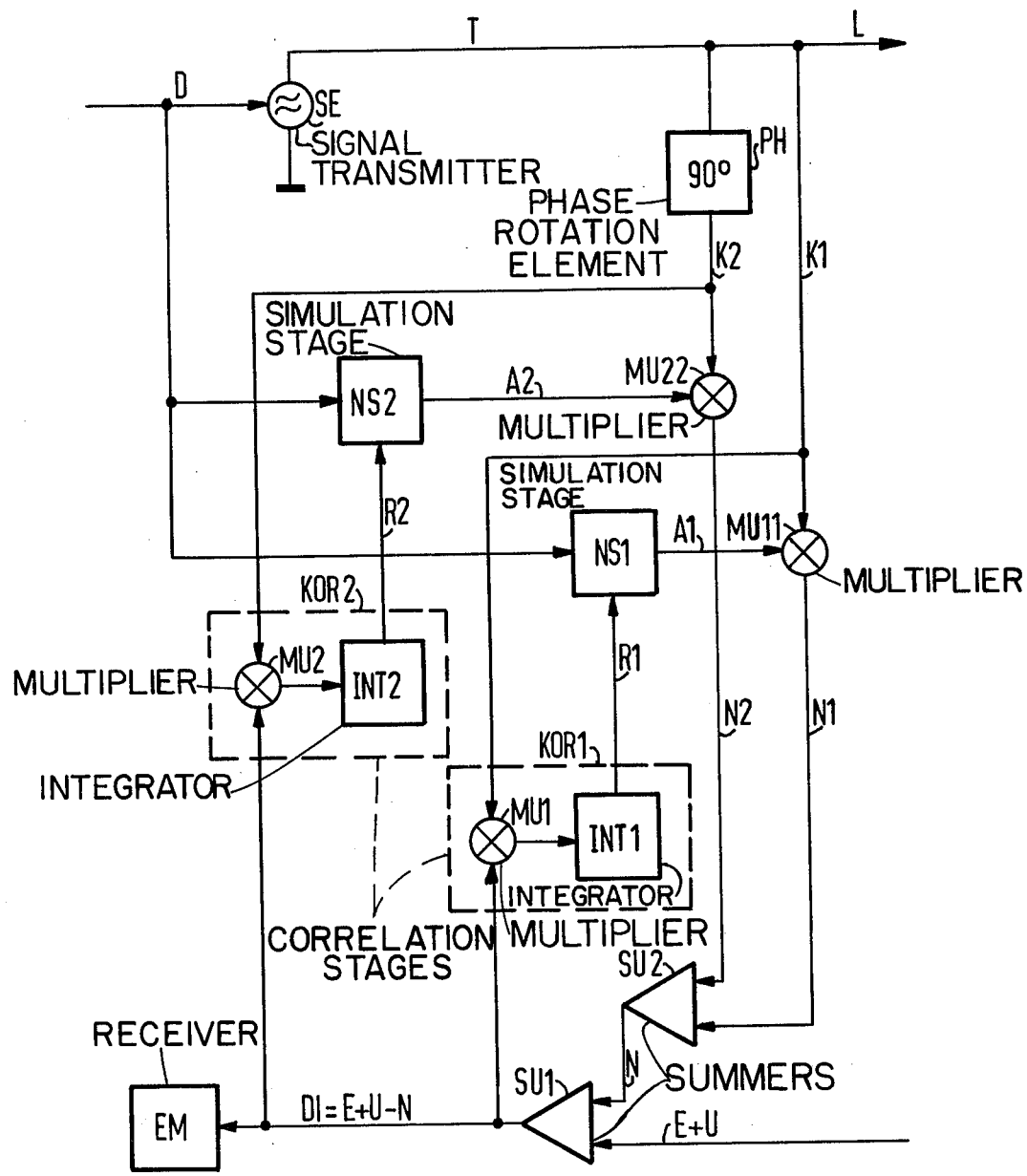
FIG. 1 is a block circuit diagram of a station for transmitting data with a modulated carrier, in which a real component and an imaginary component of a compensation signal are formed.

FIG. 1 illustrates a station from which data D are to be transmitted across a two-wire line L to a remote station which, although not shown, is of identical construction. In the same manner, data are also to be transmitted from the remote station to the station illustrated in FIG. 1. If data is to be transmitted simultaneously in both directions across a two-wire line, as is known, it is necessary to prevent the signal emitted from the transmitter SE from disturbing the receiver EM of the first station. If a base band signal is transmitted across a two-wire line, a simulation stage is used to produce a compensation signal which suppresses the cross-talk signal which originates from the signals of the first transmitter SE.

In accordance with FIG. 1, no base band signal is transmitted across the two-wire line L, but the transmitter SE is used to produce a modulated carrier T in dependence upon the data D, which is transmitted across the two-wire line L. The modulated carrier T also produces a cross-talk signal U which is superimposed on the received signal E and which must be suppressed in order to prevent interference in the receiver EM of the station in question. The cross-talk signal is suppressed by the production of a compensation signal N which is formed from the two components N1 and N2 and by means of which, employing an adder SU1, a difference signal DI is formed which is fed to the receiver EM.

The compensation signal is formed in that the modulated carrier T is split into two orthogonal signal components K1 and K2 whose phase angles differ by 90°. In the present exemplary embodiment, the first orthogonal signal component K1 is identical to the modulated carrier, whereas the other orthogonal signal component K2 is formed by means of a phase rotating element PH which produces a phase rotation of 90°. The component K1 represents the real component of the modulated carrier T, whereas the component K2 represents an imaginary component thereof. By correlation, the difference signal DI having the two orthogonal signal components K1 and K2 in the correlation stages KOR1 and KOR2, respectively, a first regulating signal R1 and a second regulating signal R2 are produced which indicate the deviation of the first orthogonal signal component K1 from the corresponding first signal component U1 of the cross-talk signal U, and the deviation of the second orthogonal signal component K2 from a corresponding second signal component U2 of the cross-talk signal U, respectively, although the first and second signal components U1 and U2 are not separately derived.

Figure 2:
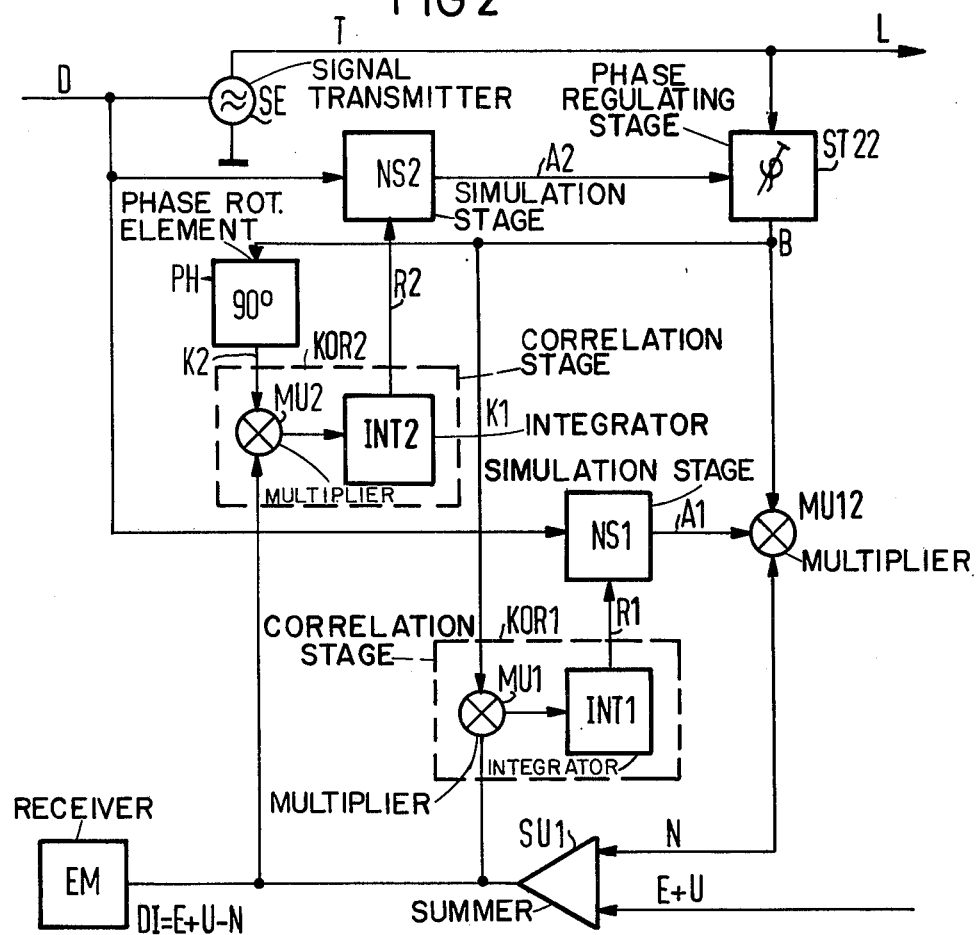
FIG. 2 is a block circuit diagram of a station for transmitting data with the aid of a modulated carrier where a magnitude component and a phase angle component of the compensation signal are used to suppress the cross-talk signals.

The two regulating signals R1 and R2 each control a simulation stage NS1 and NS2, respectively. Simulation stages of this type are known in connection with the transmission of base band signals across two-wire lines. In accordance with known processes, known simulation stages are supplied with a base band signal and, in dependence upon the cross-talk signal, a regulating signal is formed and in this manner disturbances are prevented in a transmitted base band signal in the receiver in question. For example, the periodical "The Bell System Technical Journal", March 1971, p. 789, FIG. 2, represents a known simulation stage within a block represented in broken lines. The simulation stages NS1 and NS2 illustrated in FIG. 1 are fundamentally identical to known simulation stages. However, the signals A1 and A2 which they emit differ from the output signals of known simulation stages, since the simulation stages illustrated in FIG. 1 are supplied with different regulating signals R1 and R2, respectively.

By multiplicative mixing of a first dummy signal A1 and the signal component K1 with the aid of a multiplier MU11, the multiplicative signal N1 is formed. By multiplicative mixing of a second dummy signal A2 and the second component K2 with the aid of a multiplier MU22, the multiplicative signal N2 is formed. With the aid of an adder SU2, the two multiplicative signals N1 and N2 are combined and a compensation signal N is formed.

An adder SU1 receives, on the one hand, the received signal E which emanates from the remote station, with the superimposed cross-talk signal U, and, on the other hand, receives the compensation signal N. The difference signal DI is identical to the received signal with the cross-talk signal U, minus the compensation signal N.

The correlators KOR1 and KOR2 each comprise a multiplier MU1, MU2 and an integrator INT1, INT2, respectively. These integrators, on the one hand, fulfill the function of eliminating products of orthogonal signal components in the formation of the regulating signals R1 and R2. For this purpose, it is sufficient to carry out at least one integration over one period since the products of the orthogonal signal components which are added over one period of these orthogonal signal components are equal to zero.

FIG. 2 illustrates a station from which the data D are transmitted to a remote station (not shown). As in the case of FIG. 1, the adder SU1 illustrated in FIG. 2 receives from the remote station a mixture composed of the received signal E and the cross-talk signal U. In order that the cross-talk signal U may be suppressed, the compensation signal N is formed and the difference signal DI is formed from the received signal E and the cross-talk signal U, minus the compensation signal N. The conditions on which FIG. 2 are based are thus identical to those described with reference to FIG. 1.

The compensation signal N is formed in that, first of all, the modulated carrier T is fed to a phase regulating stage ST22 which carries out a phase rotation of the modulated carrier in dependence upon a phase adjusting signal A2. In this manner, a phase signal B occurs at the output of the phase regulating stage ST22. From the phase signal B are produced two orthogonal signal components K1 and K2 whose phase angles differ by 90°. In the exemplary embodiment of FIG. 2, the phase angle B is identical to the signal component K1, whereas the phase signal B and the signal component K2 differ by a phase angle of 90°. This phase rotation is carried out with the aid of a phase rotation element PH. The two signal components K1 and K2 are orthogonal to one another inasmuch as the products added over one period of these signal components are equal to zero.

By correlating the difference signals DI with the two orthogonal signal components K1 and K2 by means of the correlators KOR1 and KOR2 a magnitude regulating signal R1 assigned to the magnitude and a phase regulating signal R2 assigned to the phase are produced. The magnitude regulating signal R1 indicates the deviation of the first signal component K1 from the magnitude of the cross-talk signal U. The phase regulating signal R2 indicates the deviation of the other signal component K2 from the phase angle of the cross-talk signal U. The magnitude regulating signal R1 and the phase regulating signal R2, together with the data, serve to form a magnitude adjusting signal A1 and a phase adjusting signal A2, respectively. The magnitude adjusting signal A1 indicates the amount of the compensation signal N. The phase adjusting signal A2 indicates the phase of the compensation signal N. The simulation stages NS1 and NS2 are known per se and are subject to the same comments as given above with reference to FIG. 1.

The phase of the signal B is, on the one hand, dependent upon the phase of the modulated carrier and, on the other hand, upon the phase adjusting signal A2. The magnitude adjusting signal A1 and the phase signal B are mixed in multiplicative fashion by means of a multiplier MU12 so as to produce the compensation signal N. As in the case of the structure of FIG. 1, the correlators KOR1 and KOR2 comprise respective multipliers MU1, MU2 and respective integrators INT1, INT2. The discussion above with respect to integration duration also applies to the apparatus of FIG. 2.

Figure 3:
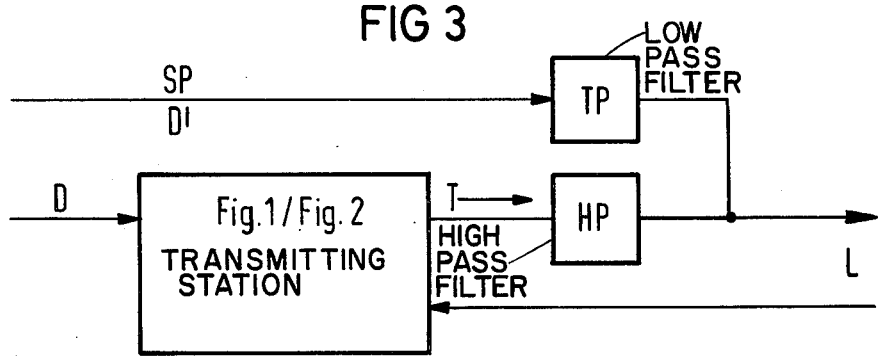
FIG. 3 is a block circuit diagram for explaining the simultaneous transmission of a speech signal and a data signal or the simultaneous transmission of two data signals.

FIG. 3 illustrates the simultaneous transmission of a speech signal and the data across a two-wire line L. Either of the circuit arrangements illustrated in FIG. 1 and FIG. 2 may be employed at the point so labeled in FIG. 3. Therefore, the pertinent circuit arrangement is supplied with data D as in FIG. 1 and FIG. 2. A high-pass filter HP is connected to the output of the particular circuit employed and connected to the two-wire line. If the speech signal SP is to be transmitted in addition to the data D, this action is carried out by way of a low-pass filter TP which connects the speech signal to the two-wire line L. The cut-off frequencies of the low-pass filter TP and the high-pass filter HP are designed to be such that two non-overlapping frequency bands are provided for the modulated carrier T, on the one hand, and for the speech signal SP, on the other hand.

If desired, further data D', in the form of a base band data signal, can be transmitted in addition to the data D. Here, again, the modulated carrier T is supplied across the high-pass filter HP, and the further data D' are transmitted across the low-pass filter TP in different frequency bands by way of the two-wire line L.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modfications as may reasonably and properly be included within the scope of my contribution to the art.

I claim:

1. A process for transmitting data over a two-wire line from a first station to a remote, second station and vice-versa, wherein the data of the first station produce a cross-talk signal comprising first and second signal components, which cross talk signal is superimposed upon a received signal which comprises a cross-talk superposed data modulated carrier transmitted from the remote, second station and occurs in the received signal at the first station, comprising the steps of:

transmitting the data with a data modulated carrier over the two-wire line;

branching the modulated carrier into first and second orthogonal signal components whose phase angles differ by 90°;

correlating a difference signal with the first and second orthogonal signal components, respectively, to produce a first regulating signal indicating the deviation of the first orthogonal signal component from the first signal component of the cross-talk signal and a second regulating signal indicating the deviation of the second orthogonal signal component from the second signal component of the cross-talk signal;

producing first and second dummy signals from the first and second regulating signals and the data, respectively;

multiplying the first orthogonal signal component and the first dummy signal, and the second orthogonal signal component and the second dummy signal to produce first and second multiplicative signals;

summing the first and second multiplicative signals to produce a compensation signal; and summing the cross-talk superposed data modulated carrier and the compensation signal to produce the difference signal.

2. The process of claim 1, comprising the further step of:

transmitting a further signal over the two-wire line in a frequency band which does not overlap the frequency band of the modulated carrier.

3. The process of claim 2, wherein the step of transmitting a further signal is defined as:

transmitting a speech signal.

4. The process of claim 2, wherein the step of transmitting a further signal is defined as:

transmitting a further base band data signal.

5. The process of claim 1, wherein the step of dividing the modulated carrier is defined as:

dividing the modulated carrier into a first orthogonal signal component which is identical to the modulated carrier and a second orthogonal signal component phase 90° therefrom.

6. The process of claim 1, wherein the step of correlating the difference signal is defined as:

multiplying the difference signal with the first orthogonal signal component to obtain a first multiplied signal;

integrating the first multiplied signal to obtain the first regulating signal;

multiplying the difference signal with the second orthogonal signal component to obtain a second multiplied signal; and integrating the second multiplied signal to obtain the second regulating signal.

7. A process for transmitting data over a two-wire line from a first station to a remote, second station and vice-versa, wherein the data of the first station produce a cross-talk signal comprising first and second signal components, which cross-talk signal is superposed on a received signal which comprises a cross-talk superposed data modulated carrier transmitted from the remote, second station and occurs in the received signal at the first station, comprising the steps of:

transmitting the data with a data modulated carrier over the two wire line;

branching the modulated carrier into first and second orthogonal signal components whose phase angle differ by 90°;

correlating a different signal with the first and second orthogonal signal components, respectively, to produce a first regulating signal indicating the deviation of the first orthogonal signal component from the first signal component of the cross-talk signal and a second regulating signal indicating the deviation of the second orthogonal signal component from the second signal component of the cross-talk signal;

producing first and second dummy signals from the first and second regulating signals and the data, respectively;

multiplying the first orthogonal signal component and the first dummy signal to produce a multiplicative compensation signal;

shifting the phase of the modulated carrier with the second dummy signal prior to branching the modulated carrier into first and second orthogonal signal components; and summing the cross-talk superposed data modulated carrier and the multiplicative compensation signal to produce the difference signal.

8. The process of claim 7, comprising the further step of:
transmitting a further signal over the two-wire line in a frequency band which does not overlap the frequency band of the modulated carrier.

9. The process of claim 7, wherein the step of transmitting a further signal is defined as:
transmitting a speech signal.

10. The process of claim 7, wherein the step of transmitting a further signal is defined as:
transmitting a further base band data signal.

11. The process of claim 7, wherein the step of deriving first and second orthogonal signal components is defined as:
dividing the phase shifted data modulated carrier into two signal components; and
shifting one of the two signal components 90° with respect to the other signal component.

12. The process of claim 7, wherein the step correlating the difference signal with the orthogonal signal components is defined as:
multiplying the difference signal with the first orthogonal signal component to produce a first multiplication signal;
integrating the first multiplication signal to produce the first regulating signal;
multiplying the difference signal with the second orthogonal signal component to produce a second multiplication signal; and
integrating the second multiplication signal to produce the second regulating signal.

13. Apparatus for transmitting data over a two-wire line from a first station to a remote, second station and vice-versa; wherein the data of the first station produce a cross-talk signal comprising first and second signal components, the cross-talk signal being superimposed upon a received signal which comprises a cross-talk superposed data modulated carrier transmitted from the remote, second station and occurs in the received signal at the first station, comprising:
a data input;
a receiving input;
transmitting means connected to said data input for transmitting the data with a data modulated carrier over the two-wire line;
branching means connected to said transmitting means for branching the modulated carrier into first and second orthogonal signal components whose phase angles differ by 90°;
correlating means for correlating the difference signal with a first and second orthogonal signal components, respectively, to produce a first regulating signal indicating the deviation of the first orthogonal signal components from the first signal component of the cross-talk signal and a second regulating signal indicating the deviation of the second orthogonal signal component from the second signal component of the cross-talk signal;
simulation means connected to said data input and to said correlating means for producing first and second dummy signals from the first and second regulating signals and the data, respectively;
multiplying means connected to said branching means and to said simulation means for multiplying the first orthogonal signal component and the first dummy signal and the second orthogonal signal component and the second dummy signal to produce first and second multiplicative signals, respectively;
a first summer connected to said multiplying means for summing the first and second multiplicative signals to produce a compensation signal; and
a second summer connected to said first summer and to said receiving input to receive the cross-talk superposed modulated data signal for summing the cross-talk superposed modulated data signal and the compensation signal to produce the difference signal.

14. The apparatus of claim 13, wherein said correlating means comprises:
first and second multipliers connected to receive the difference signal and the first and second orthogonal signal components, respectively; and
first and second integrators respectively connected to said first and second multipliers for producing the first and second regulating signals.

15. The apparatus of claim 13, wherein said dividing means comprises:
a first line directly connecting said transmitting means to said multiplying means; and
a second line, including a phase shifter therein, connecting said transmitting means to said multiplying means.

16. The apparatus of claim 13, for simultaneously transmitting another signal over the two-wire line, comprising:
a high-pass filter connecting said transmitting means to the two-wire line; and
a low-pass filter connecting the other signal to the two-wire line.

17. Apparatus for transmitting data over a two-wire line from a first station to a remote, second station and vice-versa, wherein at the first station, the data produce a cross-talk signal comprising first and second signal components, which cross-talk signal is superimposed upon a received signal which comprises a cross-talk superimposed data modulated carrier transmitted from the remote, second station and occurs in the received signal at the first station, comprising:
a data input;
transmitting means connected to said data input for transmitting the data with a data modulated carrier over the two-wire line;

phase shifting means connected to said transmitting means for producing first and second orthogonal signal components whose phase angles differ by 90°;

correlating means including first and second outputs and connected to said phase shifting means for correlating a difference signal with the first and second orthogonal signal components, respectively, to produce first and second regulating signals respectively indicating magnitude and phase deviations of the two orthogonal signal components with respect to the first and second components of the cross-talk signal;

simulation means connected to said data input and to said first and second outputs of said correlating means for producing first and second dummy signals, respectively, said simulation means connected to said phase shifting means for controlling the phases of the first and second orthogonal signal components simultaneously with the second dummy signal;

multiplying means connected to said simulation means and to said phase shifting means for producing a compensation signal by multiplying the first orthogonal signal component with the first dummy signal;

a receiving input; and summing means connected to said multiplying means and to said receiving input for producing the difference signal.

18. The apparatus of claim 17, wherein said phase shifting means comprises:
an adjustable phase shifter for shifting the phase of the data modulated carrier in response to said second dummy signal.

19. The apparatus of claim 18, wherein said phase shifting means comprises:
a first line directly connecting said adjustable phase shifter to said multiplying means; and
a second line, including a 90° phase shifter therein, connecting said adjustable phase shifter to said correlating means.

20. The apparatus of claim 17, wherein said correlating means comprises:
first and second multipliers connected to receive the difference signal and the first and second orthogonal signal components, respectively; and
first and second integrators respectively connected to said first and second multipliers for producing the first and second regulating signals.

21. The apparatus of claim 17, for simultaneously transmitting another signal over the two-wire line, comprising:
a high-pass filter connecting said transmitting means to the two-wire line; and
a low-pass filter connecting the other signal to the two-wire line.

* * * * *